United States Patent
Casamassima et al.

(10) Patent No.: US 12,255,712 B2
(45) Date of Patent: Mar. 18, 2025

(54) COMMUNICATION DEVICE AND METHOD OF OPERATION

(71) Applicant: NXP B.V., Eindhoven (NL)

(72) Inventors: Filippo Casamassima, Thal (AT); David Veit, Graz (AT); Dorian Haslinger, Nestelbach bei Graz (AT); Wolfgang Eber, Graz (AT)

(73) Assignee: NXP B.V., Eindhoven (NL)

( * ) Notice: Subject to any disclaimer, the term of this patent is extended or adjusted under 35 U.S.C. 154(b) by 58 days.

(21) Appl. No.: 18/124,295

(22) Filed: Mar. 21, 2023

(65) Prior Publication Data
US 2023/0327720 A1    Oct. 12, 2023

(30) Foreign Application Priority Data
Apr. 12, 2022 (EP) .................... 22167808

(51) Int. Cl.
*H04B 7/06* (2006.01)
*H04B 1/7163* (2011.01)

(52) U.S. Cl.
CPC ......... *H04B 7/0608* (2013.01); *H04B 1/7163* (2013.01)

(58) Field of Classification Search
CPC ........................... H04B 1/7163; H04B 7/0608
See application file for complete search history.

(56) References Cited

U.S. PATENT DOCUMENTS

| | | |
|---|---|---|
| 5,561,673 A | 10/1996 | Takai et al. |
| 7,366,139 B2 | 4/2008 | Poegel et al. |
| 8,531,337 B2 | 9/2013 | Soler Castany et al. |
| 9,961,600 B2 | 5/2018 | Gopal et al. |
| 10,033,114 B2 | 7/2018 | Anguera Pros et al. |
| 10,440,650 B2 | 10/2019 | Clevorn |
| 11,057,742 B2 | 7/2021 | Schober et al. |
| 2009/0323872 A1 | 12/2009 | Haller |
| 2012/0087431 A1 | 4/2012 | Liu et al. |
| 2014/0273866 A1 | 9/2014 | Swaminathan et al. |

(Continued)

FOREIGN PATENT DOCUMENTS

| | | |
|---|---|---|
| AU | 1842199 A1 | 9/1999 |
| CN | 111669208 A | 9/2020 |

(Continued)

OTHER PUBLICATIONS

U.S. Appl. No. 18/066,366, Haslinger et al., "Localization System and Operating Method," filed Dec. 15, 2022, 23 pages.

*Primary Examiner* — David B Lugo (57) ABSTRACT

In accordance with a first aspect of the present disclosure, a communication device is provided, comprising: an ultra-wideband (UWB) communication unit configured to carry out UWB communication with an external communication device; a plurality of antennas operatively coupled to said UWB communication unit, at least one inertial sensor; an antenna selection unit configured to select, based on an output of the inertial sensor, a specific antenna of said plurality of antennas for carrying out the UWB communication. In accordance with a second aspect of the present disclosure, a corresponding method of operating a communication device is conceived. In accordance with a third aspect of the present disclosure, a computer program is provided for carrying out said method.

17 Claims, 6 Drawing Sheets

(56) References Cited

U.S. PATENT DOCUMENTS

| | | | |
|---|---|---|---|
| 2018/0132116 A1* | 5/2018 | Shekhar | H04W 64/006 |
| 2020/0037109 A1* | 1/2020 | Zhang | G01S 5/0218 |
| 2020/0348406 A1 | 11/2020 | Jain et al. | |
| 2021/0399761 A1 | 12/2021 | Parthasarathi et al. | |
| 2022/0046447 A1* | 2/2022 | Pedersen | G06N 3/08 |
| 2022/0110088 A1* | 4/2022 | Bao | G01S 5/0205 |
| 2022/0123784 A1* | 4/2022 | Lim | H04W 12/041 |
| 2022/0291374 A1* | 9/2022 | Ryu | G01S 13/878 |

FOREIGN PATENT DOCUMENTS

| | | |
|---|---|---|
| EP | 2490347 A1 | 8/2012 |
| EP | 3848918 A | 1/2020 |
| EP | 3886468 A1 | 9/2021 |
| JP | 2928224 B1 | 8/1999 |
| KR | 19990009325 A | 2/1999 |
| KR | 100270227 B1 | 10/2000 |
| WO | 2021029617 A1 | 2/2021 |

\* cited by examiner

COMMUNICATION DEVICE AND METHOD OF OPERATION

CROSS-REFERENCE TO RELATED APPLICATIONS

This application claims the priority under 35 U.S.C. § 119 of European Patent application no. 22167808.9, filed on 12 Apr. 2022, the contents of which are incorporated by reference herein.

TECHNICAL FIELD

The present disclosure relates to a communication device. Furthermore, the present disclosure relates to a corresponding method of operating a communication device, and to a computer program for carrying out said method.

BACKGROUND

Ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

SUMMARY

In accordance with a first aspect of the present disclosure, a communication device is provided, comprising: an ultra-wideband (UWB) communication unit configured to carry out UWB communication with an external communication device; a plurality of antennas operatively coupled to said UWB communication unit, at least one inertial sensor; an antenna selection unit configured to select, based on an output of the inertial sensor, a specific antenna of said plurality of antennas for carrying out the UWB communication.

In one or more embodiments, the output of the inertial sensor is indicative of a movement of the communication device and/or an orientation of the communication device relative to the external communication device.

In one or more embodiments, the antenna selection unit is further configured to select the specific antenna by analyzing a channel impulse response (CIR) resulting from the UWB communication.

In one or more embodiments, the antenna selection unit is further configured to select the specific antenna based on one or more of the following parameters related to the CIR: a first path amplitude; a maximum path amplitude; a ratio between the first path amplitude and maximum path amplitude; a time difference between the first path and the maximum path; an energy level of the first path; a mean excess delay value; an energy level of the first path and of the maximum path.

In one or more embodiments, the antenna selection unit is configured to select the specific antenna using a machine learning algorithm.

In one or more embodiments, the inertial sensor is a gyroscope, a magnetometer or an accelerometer.

In one or more embodiments, if the communication device comprises two or more inertial sensors, the antenna selection unit is configured to perform a sensor fusion algorithm to combine the outputs of said inertial sensors.

In one or more embodiments, the antenna selection unit is configured to select the specific antenna based on the combined outputs of the inertial sensors.

In one or more embodiments, the communication device is a mobile node in a localization system.

In one or more embodiments, a localization system comprises a communication device of the kind set forth and at least one external communication device, in particular an anchor node, configured to carry out ranging operations with the communication device.

In one or more embodiments, said anchor node comprises a plurality of anchor antennas and wherein the antenna selection unit is further configured to select, based on an output of the inertial sensor, a specific anchor antenna of the plurality of anchor antennas for carrying out the UWB communication.

In one or more embodiments, the communication device is configured to transmit data indicative of the specific anchor antenna selected by the antenna selection unit to the anchor node.

In accordance with a second aspect of the present disclosure, a method of operating a communication device is conceived, the communication device comprising an ultra-wideband, UWB, communication unit, a plurality of antennas operatively coupled to said UWB communication unit, at least one inertial sensor and an antenna selection unit, the method comprising: carrying out, by the UWB communication unit, UWB communication with an external communication device; selecting, by the antenna selection unit, a specific antenna of said plurality of antennas for carrying out the UWB communication, wherein said selecting is based on an output of the inertial sensor.

In accordance with a third aspect of the present disclosure, a computer program is provided, comprising executable instructions which, when executed by a communication device, cause said communication device to carry out a method of the kind set forth.

DESCRIPTION OF DRAWINGS

Embodiments will be described in more detail with reference to the appended drawings.

DESCRIPTION OF EMBODIMENTS

As mentioned above, UWB communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

In particular, UWB technology—also referred to as impulse-radio ultra-wideband (IR-UWB)— is an RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, so-called UWB frames (i.e., UWB signals) will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The angle-of-arrival (AoA) mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. The AoA mode of operation may facilitate a more accurate determination of the position of an object and may thus complement ranging operations performed in the ranging mode. As used in this description, the ranging mode of operation may therefore be extended to include the AoA mode of operation, in the sense that when a device operates in the ranging mode, it may optionally perform additional operations which are typically performed in the AoA mode of operation.

Accordingly, a benefit of using an IR-UWB system is that a channel impulse response, as determined by a responder using a received UWB frame, can be used to determine not only the distance (i.e., the range) to an initiator but also the angle of arrival of the incoming radio-frequency (RF) wave from the initiator, which allows the system to use both range and angle for precise localization. It is noted that the format of UWB frames is defined in the technical standard 802.15.4z-2020 (*IEEE Standard for Low-Rate Wireless Networks, Amendment 1: Enhanced Ultra Wideband (UWB) Physical Layers (PHYs) and Associated Ranging Techniques*).

UWB-based localization for vehicle access can suffer from multipath effects (i.e., signal reflections) and attenuation due to environmental factors. For this reason, devices with multiple antennas have been developed. In such devices, the antennas can be placed in different locations and eventually with different polarization. This may result in an advantage, since the signal path to each antenna is different and one antenna can perform better than the other. However, a problem with this configuration is that, in order to achieve optimal results, it may be necessary to use all antennas to communicate, and then choose which is the best one. This, in turn, increases the amount of energy and time needed to perform a localization task, because either multiple communications sessions should be performed, or multiple receivers should be active simultaneously.

Now discussed are a communication device and a corresponding method of operating a communication device, which facilitate selecting an appropriate antenna for communicating with an external communication device. In particular, the presently disclosed device and method facilitate selecting a specific antenna, from a set of available antennas, which results in a more accurate distance measurement (i.e., ranging result) compared to the other antennas included in said set. At the same time, since not all the available antennas need to be used for the communication, the amount of energy and time needed to perform a localization task (i.e., a ranging session) does not increase significantly.

Figure 1:
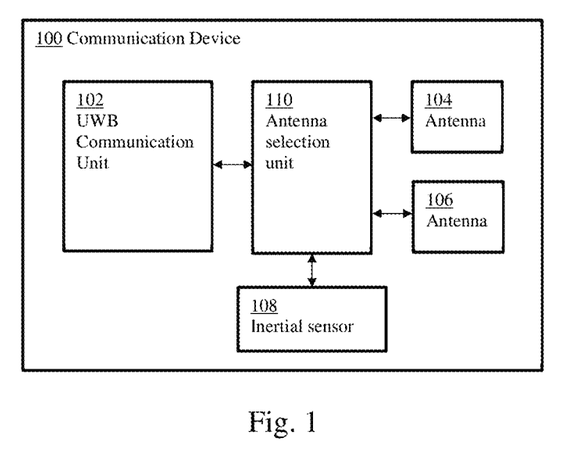
FIG. 1 shows an illustrative embodiment of a communication device.

FIG. 1 shows an illustrative embodiment of a communication device 100. The communication device 100 includes a UWB communication unit 102, a plurality of antennas 104, 106, an inertial sensor 108 and an antenna selection unit 110. The UWB communication unit 102 is configured to carry out UWB communication with an external communication device (not shown). It is noted that the term "external" refers to the fact that the external communication device is not included in the communication device 100. The plurality of antennas 104, 106 is operatively coupled to the UWB communication unit 102. Furthermore, the antenna selection unit 110 is configured to select, based on an output of the inertial sensor, a specific antenna of said plurality of antennas 104, 106 for carrying out the UWB communication. By taking into account the output of the inertial sensor, an appropriate antenna may be selected for carrying out the UWB communication.

In one or more embodiments, the output of the inertial sensor is indicative of a movement of the communication device and/or an orientation of the communication device relative to the external communication device. In this way, the selection of an appropriate antenna is further facilitated. In particular, the movement and/or orientation of the communication device may negatively affect the quality of the UWB communication between the communication device and the external communication device. If the antenna selection is based, at least partially, on the movement and/or orientation of the communication device, then a more appropriate antenna may be selected compared to a scenario in which said movement and/or orientation is not taken into account.

In one or more embodiments, the antenna selection unit is further configured to select the specific antenna by analyzing a channel impulse response (CIR) resulting from the UWB communication. In this way, the selection of a suitable antenna may be further facilitated. In one or more embodiments, the antenna selection unit is further configured to select the specific antenna based on one or more of the following parameters related to the CIR: a first path amplitude; a maximum path amplitude; a ratio between the first path amplitude and maximum path amplitude; a time difference between the first path and the maximum path; an energy level of the first path; a mean excess delay value; or an energy level of the first path and of the maximum path. The inventors have found that these parameters are particularly suitable for selecting an appropriate antenna. Furthermore, in one or more embodiments, the antenna selection unit is configured to select the specific antenna using a machine learning algorithm. In this way, the antenna selection can be optimized more easily in applications such as vehicle access, in which the environment surrounding the vehicle may frequently change.

It is noted that the term "maximum path" refers to the bin or tap in the CIR with the highest absolute value. Since CIRs are complex-valued, the maximum path may be defined as the index of the tap with the highest value sqrt $(R^2+I^2)$ in the CIR, wherein sqrt denotes the square root function, R denotes the real part of the complex-valued CIR, and I denotes the imaginary part of the complex-valued CIR. Furthermore, the term "first path energy" refers to the absolute sum of the taps in the CIR between the local minima before and after the detected first path tap. Similarly, the term "maximum path energy" refers the absolute sum of the taps between the local minima before and after the detected maximum path tap. Finally, the term "mean excess delay" refers to the average index of the paths within the excess delay interval, weighted by the tap powers. The excess delay interval is the range in the CIR that is of interest (i.e., the range which contains information different from noise). This interval may be defined by using a threshold relative to the detected first path, or it may be defined by a user.

In one or more embodiments, the inertial sensor is a gyroscope, a magnetometer or an accelerometer. These types of inertial sensor may provide an accurate indication of the movement and/or orientation of the communication device. In particular, a gyroscope is typically configured to track rotatory movements. A magnetometer measures the direction of the magnetic field, which provides an absolute orientation with regard to the magnetic field of the earth. An accelerometer is used for tracking linear accelerations. In a practical realization, the communication device may include a so-called inertial measurement unit (IMU), which typically contains a gyroscope, a magnetometer and an accelerometer.

In one or more embodiments, if the communication device comprises two or more inertial sensors, the antenna selection unit is configured to perform a sensor fusion algorithm to combine the outputs of said inertial sensors. Furthermore, the antenna selection unit may be configured to select the specific antenna based on the combined outputs of the inertial sensors. In this way, a more accurate indication of the movement and/or orientation of the communication device may be used for the antenna selection, compared to a scenario in which only the output of a single inertial sensor is used. In a practical realization, the communication device is a mobile node in a localization system.

In one or more embodiments, a localization system comprises a communication device of the kind set forth and at least one external communication device, in particular an anchor node, configured to carry out ranging operations with the communication device. Since the antenna selection in said localization system is based, at least partially, on the output of an inertial sensor included in the communication device, more accurate ranging operations may be performed. Furthermore, in one or more embodiments, the anchor node comprises a plurality of anchor antennas and the antenna selection unit is further configured to select, based on an output of the inertial sensor, a specific anchor antenna of the plurality of anchor antennas for carrying out the UWB communication. In this way, the accuracy of the ranging operations may be further increased, because the most appropriate pair of antennas may be selected for the UWB communication (i.e., the most appropriate combination of anchor node antenna and mobile node antenna). In a practical realization, the communication device is configured to transmit data indicative of the specific anchor antenna selected by the antenna selection unit to the anchor node.

Figure 2:
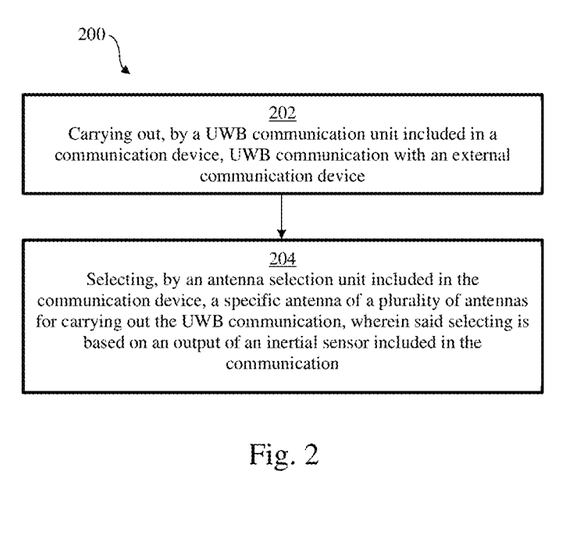
FIG. 2 shows an illustrative embodiment of a method of operating a communication device.

FIG. 2 shows an illustrative embodiment of a method 200 of operating a communication device. The method 200 comprises the following steps. At 202, a UWB communication unit included in a communication device carries out UWB communication with an external communication device. Furthermore, at 204, an antenna selection unit included in the communication device selects a specific antenna of a plurality of antennas for carrying out the UWB communication, wherein said selecting is based on an output of an inertial sensor included in the communication. As mentioned above, by taking into account the output of the inertial sensor, an appropriate antenna may be selected for carrying out the UWB communication.

In accordance with the present disclosure, the selection of the most appropriate antenna in a multi-antenna communication device is facilitated. More specifically, the most appropriate antenna may be the antenna that most likely results in the most accurate distance estimation, among the available antennas. In particular, when ranging is performed between a multi-antenna anchor and a multi-antenna mobile node, information from other sensors in the mobile node can be used for the antenna choice. In particular, an inertial sensor such as an accelerometer, gyroscope and magnetometer, may provide information on the orientation and movements of the mobile node. This information may support the decision on which antenna to select on the side of the mobile node and on the side of the anchor nodes (as integrated in a vehicle, for example).

Figure 3:
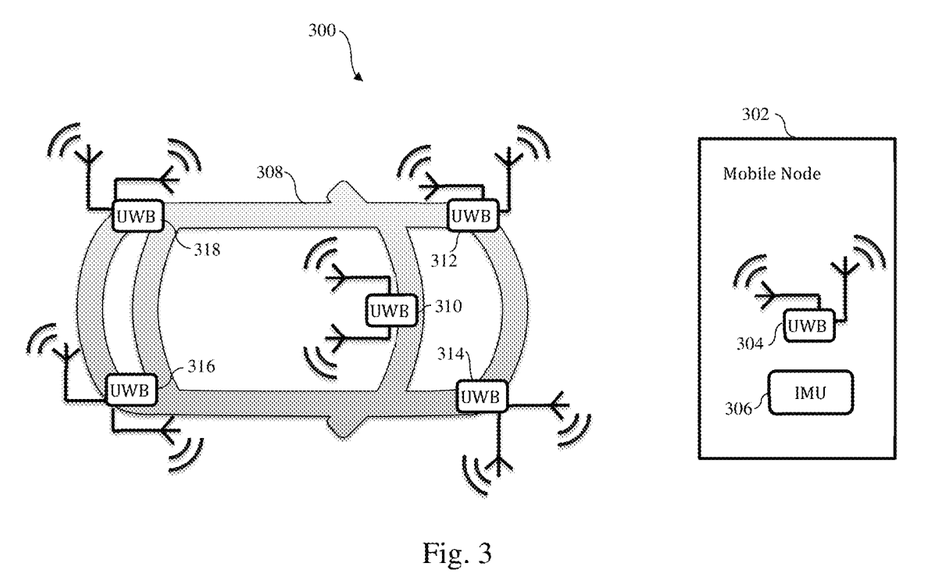
FIG. 3 shows an illustrative embodiment of a localization system.

FIG. 3 shows an illustrative embodiment of a localization system 300. The localization system 300 includes a vehicle 308 comprising a plurality of UWB-enabled anchor nodes 310, 312, 314, 316, 318. Furthermore, the localization system 300 includes an UWB-enabled mobile node 302 that should be localized by the vehicle 308. To this end, one or more of the UWB-enabled anchor nodes 310, 312, 314, 316, 318 carry out UWB communication with a UWB communication unit 304 included in the UWB-enabled mobile node 302. More specifically, ranging sessions involving distance measurements are performed between one or more of the UWB-enabled anchor nodes 310, 312, 314, 316, 318 and the UWB communication unit 304 included in the UWB-enabled mobile node 302. The UWB-enabled mobile node 302 also includes an IMU 306, by means of which the movement and/or orientation of the UWB-enabled mobile node 302 can be determined. The UWB-enabled mobile node 302 further includes an antenna selection unit (not shown) which is configured to select an antenna, from a plurality of antennas coupled to the UWB communication unit 304, based on an output of the IMU 306. In addition, the antenna selection unit may select said antenna based on other input, such as a result of an analysis of a CIR and/or parameters related to the CIR resulting from the ranging sessions. The skilled person will appreciate that both in the UWB-enabled mobile node 302 and in the plurality of UWB-enabled anchor nodes 310, 312, 314, 316, 318 the multiple antennas may be either connected to a single receiver through a switch, to an integrated circuit (IC) with multiple receiver (RX) ports or to multiple UWB receiver ICs.

The use of multi-antenna devices has been shown to be beneficial in some scenarios for car access when the line-of-sight communication is compromised. For instance, the human body or other objects in the vicinity of the car can significantly attenuate the signal strength of UWB packets. If in addition a mobile node is randomly oriented, then a polarization mismatch may occur between transmit and receive antennas, resulting in further signal quality degradation. This effect may be mitigated by using antennas with different polarization. However, the use of multiple antennas may increase the energy consumption of the devices. It is noted that the multi-antenna communication may be performed in parallel (in which case the devices require multiple receive blocks) or in sequence (in which case multiple messages should be sent, which also increases the measurement time). By selecting the antenna used for a localization task at least partially in dependence on an output of the IMU 306, the energy consumption of the devices may be kept at an acceptable level.

Figure 4:
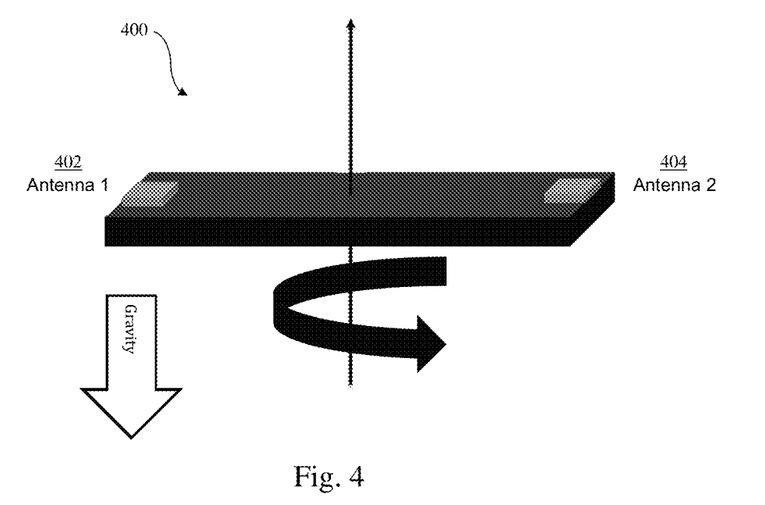
FIG. 4 shows an illustrative embodiment of a mobile node.

FIG. 4 shows an illustrative embodiment of a mobile node 400. The mobile node 400 comprises two antennas 402, 404. In accordance with the present disclosure, the output of an inertial sensor (not shown) may be used to select an appropriate antenna for a ranging session, among the two available antennas 402, 404. However, in the case of a first measurement an ambiguity may be present in the orientation of the antennas 402, 404. Therefore, the analysis of the CIR or features of the CIR (i.e., parameters related to the CIR) may be used to facilitate computing the correct orientation of the mobile node 400 relative to the anchor nodes. It is noted that the inertial sensor may be a gyroscope, a magnetometer or an accelerometer. An accelerometer may be capable of sensing static and dynamic forces of acceleration. Static forces include gravity, while dynamic forces can include vibrations and movement. A gyroscope is a device used for measuring or maintaining orientation and angular velocity. A magnetometer may be capable of measuring a magnetic field or magnetic dipole moment. Different types of magnetometers may measure the direction, strength, or relative change of a magnetic field at a particular location.

Figure 5:
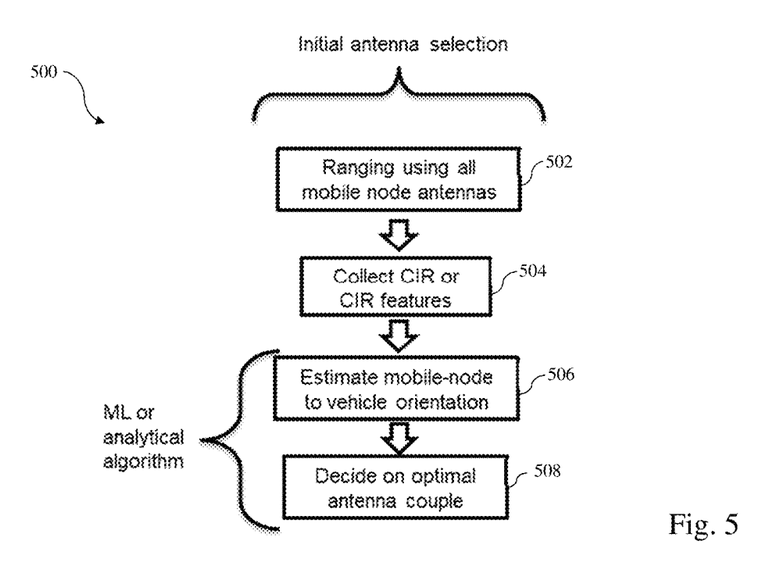
FIG. 5 shows an illustrative embodiment of an initial antenna selection process.

FIG. 5 shows an illustrative embodiment of an initial antenna selection process 500. The initial antenna selection process 500 includes the following steps: ranging 502 using all mobile node antennas, collecting 504 CIR or CIR features, estimating 506 mobile-node to vehicle orientation, and deciding 508 on an optimal antenna couple. In car access scenarios, the location of a mobile node (e.g., a key fob or mobile phone) may have to be determined several times, such that the mobile node can be tracked. For instance, it should be determined whether the mobile node is approaching the car or moving away from the car. In order to select an appropriate antenna for performing the ranging sessions that enable determining the location of the mobile node, the mobile node uses information on its orientation relative to the car. Using this information, an antenna may be selected that has an optimal polarization, avoiding interference by obstacles.

For a first distance measurement, a measurement may be performed using all the available antennas in the mobile node. This allows to collect the CIR and other signal quality indicators for each antenna in the mobile node. For example, one or more of the following parameters may be used for this purpose: a first path amplitude, a maximum path amplitude, a ratio between the first path amplitude and maximum path amplitude, a time difference between the first path and the maximum path, an energy level of the first path, a mean excess delay value, and an energy level of the first path and of the maximum path. This information may then be used to identify the best antenna couple, in the sense that the relative orientation of the mobile node may be determined, as well as the presence of obstacles between the mobile node and the car.

It is noted that the CIR may provide information about the wireless propagation channel between the transmitter and receiver, in order to determine the amount of reflections as well as the amount of obstacles. This may be implemented using a machine learning algorithm trained to identify the best antenna, or using an analytical algorithm. The machine learning algorithm may be more suitable in applications such as car access, in which the environment may change significantly, and new obstructions or signal paths may affect which is the most suitable antenna couple. The machine learning algorithm may be trained prior to the system deployment in a controlled environment. Alternatively, a reinforced learning algorithm may be used, in which case the initial ranging with all available antennas may be used to calculate the rewards and penalties and the model may be updated accordingly.

Figure 6:
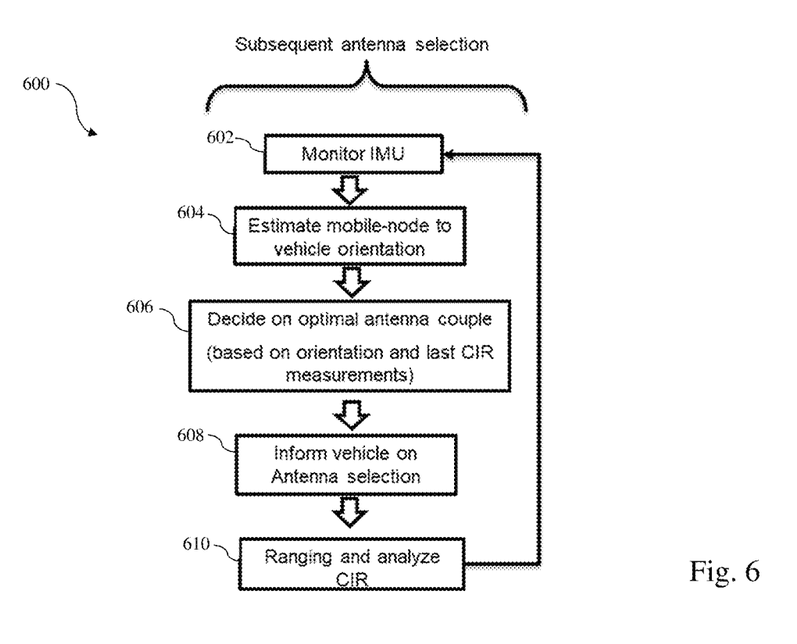
FIG. 6 shows an illustrative embodiment of a subsequent antenna selection process.

FIG. 6 shows an illustrative embodiment of a subsequent antenna selection process 600. The subsequent antenna selection process 600 includes the following steps: monitoring 602 the IMU, estimating 604 the mobile-node to vehicle orientation, deciding 606 on the optimal antenna couple, informing 608 the vehicle on the antenna selection, and ranging and analyzing 610 the CIR. In particular, after the initial antenna selection process 500 has been performed and the best antenna couple has been selected, one or more inertial sensors in the mobile node may be used to monitor its movement and orientation, and UWB ranging measurements may be carried out to track its location. More specifically, inertial sensors such as a magnetometer, accelerometer and gyroscope may provide information on how much the mobile node has been moved, and how its orientation has changed. Such information may be generated using a sensor fusion algorithm (e.g., an extended Kalman Filter) or by means of time integration of gyroscope or accelerometer data. If the mobile node does not have a full IMU, a simpler algorithm may be used, which takes for example only accelerometer data as input.

It is noted that the algorithm may only check if a movement has occurred, and if this movement exceeds a predefined threshold a new ranging measurement may be performed. Since the decision on which antenna couple to use is taken by the mobile node, the information on the appropriate antenna to use may be transmitted to the vehicle in case the vehicle's anchors are also equipped with multiple antennas. This information may be transmitted either through an out-of-band communication channel or as the first UWB message during a ranging session. It is noted that the mobile node may be enabled to take the decision on which antenna couple to use by performing an initial setup process, which may be executed, for example, when the mobile node is being coupled to the vehicle. During that process, the mobile node may receive setup data containing information about the infrastructure of the vehicle. More specifically, the mobile node may receive setup data indicative of the available anchor nodes and their antennas. Since this infrastructure typically remains unchanged, the mobile node may store the setup data, in order to use the information contained therein for the selection of the anchor antennas. Also, for subsequent ranging measurements, the CIR may be analyzed to check if the selected antenna is the most appropriate one. Similar to the initial antenna selection, this may be done either by means of a machine learning algorithm, or using an analytical algorithm that processes one or more CIR features or the entire CIR.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication device
102 UWB communication unit
104 antenna
106 antenna
108 inertial sensor
200 method of operating a communication device
202 carrying out, by a UWB communication unit included in a communication device, UWB communication with an external communication device
204 selecting, by an antenna selection unit included in the communication device, a specific antenna of a plurality of antennas for carrying out the UWB communication, wherein said selecting is based on an output of an inertial sensor included in the communication
300 localization system
302 UWB-enabled mobile node
304 UWB communication unit
306 inertial measurement unit
308 vehicle
310 UWB-enabled anchor node
312 UWB-enabled anchor node
314 UWB-enabled anchor node
316 UWB-enabled anchor node
318 UWB-enabled anchor node
400 mobile node
402 first antenna
404 second antenna
500 initial antenna selection process
502 ranging using all mobile node antennas
504 collect CIR or CIR features 506 estimate mobile-node to vehicle orientation
508 decide on optimal antenna couple
600 subsequent antenna selection process
602 monitor IMU
604 estimate mobile-node to vehicle orientation
606 decide on optimal antenna couple
608 inform vehicle on antenna selection
610 ranging and analyze CIR

What is claimed is:

1. A communication device, comprising:
an ultra-wideband (UWB) communication unit configured to carry out UWB communication with an external communication device that is movable relative to the UWB communication unit;
a plurality of antennas operatively coupled to said UWB communication unit;
at least one inertial sensor; and
an antenna selection unit configured to cause the UWB communication unit to perform a ranging operation with respect to the external communication device using the plurality of antennas, the antenna selection unit configured to determine a channel impulse response from one or more of the plurality of antennas and select a specific antenna of said plurality of antennas for carrying out the UWB communication based on the channel impulse response, the antenna selection unit is configured to determine a change in one or more of an orientation or a position based on an output of the inertial sensor and, when the change is greater than or equal to a predefined threshold, cause the UWB communication unit to perform a second ranging operation with respect to the external communication device using the plurality of antennas and optionally to select a different antenna of the plurality of antennas for subsequent UWB communications.

2. The communication device of claim 1, wherein the output of the inertial sensor is indicative of a movement of the communication device and/or an orientation of the communication device relative to the external communication device.

3. The communication device of claim 1, wherein the antenna selection unit is further configured to select the specific antenna by analyzing a channel impulse response (CIR) resulting from the UWB communication.

4. The communication device of claim 3, wherein the antenna selection unit is further configured to select the specific antenna based on one or more of the following parameters related to the CIR:
a first path amplitude;
a maximum path amplitude;
a ratio between the first path amplitude and maximum path amplitude;
a time difference between the first path and the maximum path;
an energy level of the first path;
a mean excess delay value;
an energy level of the first path and of the maximum path.

5. The communication device of claim 1, wherein the antenna selection unit is configured to select the specific antenna using a machine learning algorithm.

6. The communication device of claim 1, wherein the inertial sensor is a gyroscope, a magnetometer or an accelerometer.

7. The communication device of claim 1, wherein, in response to the communication device comprising two or more inertial sensors, the antenna selection unit is configured to perform a sensor fusion algorithm to combine the outputs of said inertial sensors.

8. The communication device of claim 7, wherein the antenna selection unit is configured to select the specific antenna based on the combined outputs of the inertial sensors.

9. The communication device of claim 1, being a mobile node in a localization system.

10. A method of operating a communication device, the communication device comprising an ultra-wideband (UWB) communication unit, a plurality of antennas operatively coupled to said UWB communication unit, at least one inertial sensor and an antenna selection unit, the method comprising:
carrying out, by the UWB communication unit, UWB communication with an external communication device that is movable relative to the plurality of antennas;
selecting, by the antenna selection unit, a specific antenna of said plurality of antennas for carrying out the UWB communication based on channel impulse responses determined from the plurality of antennas;
determining, by the at least one inertial sensor, a positional change indicative of one or more of movement or a change in orientation of the communication device based on an output of the at least one inertial sensor; and
when one or more of the positional change exceeds a pre-determined threshold, performing, by the UWB communication unit, second UWB communication with the external communication device; and
selecting, by the antenna selection unit, a second antenna of the plurality of antennas for carrying out subsequent UWB communication with the external communication device based on second channel impulse responses determined from the plurality of antennas.

11. The method of claim 10, wherein selecting, by the antenna selection unit, the specific antenna further comprising selecting, by the antenna selection unit, the specific antenna based on an analysis of a channel impulse response (CIR) resulting from the UWB communication.

12. A localization system, comprising:
a communication device, comprising:
an ultra-wideband (UWB) communication unit configured to carry out UWB communication with an external communication device that is movable relative to the communication device;
a plurality of antennas operatively coupled to said UWB communication unit;
at least one inertial sensor; and
an antenna selection unit configured to select a specific antenna of said plurality of antennas for carrying out the UWB communication based on channel impulse responses determined from the plurality of antennas, the antenna selection unit configured to determine a change in one or more of an orientation or a position of the communication device based on an output of the inertial sensor and, when the change exceeds a predetermined threshold, to cause the UWB communication unit to carry out a second UWB communication with the external communication device, the antenna selection unit configured to select a different antenna of the plurality of antennas based on second channel responses determined from the plurality of antennas; and
at least one anchor node configured to carry out ranging operations with the communication device.

13. The localization system of claim 12, wherein said anchor node comprises a plurality of anchor antennas and wherein the antenna selection unit is further configured to select, based in part on an output of the inertial sensor, a specific anchor antenna of the plurality of anchor antennas for carrying out the UWB communication.

14. The localization system of claim 13, wherein the communication device is further configured to transmit data indicative of the specific anchor antenna selected by the antenna selection unit to the anchor node.

15. A non-transitory computer-readable medium storing machine instructions which, when executed by at least one processor, cause the at least one processor to:
- cause an ultra-wideband (UWB) communication unit in a communication device to carry out, using a plurality of antennas, UWB communication with an external communication device that is movable relative to the plurality of antennas;
- cause an antenna selection unit in the communication device to select a specific antenna from plurality of antennas in the communication device based on channel impulse responses determined from the plurality of antennas;
- determine a change in one or more of an orientation or a position of the communication device based on an output of an inertial sensor in the communication device; and
- when the change exceeds a predetermined threshold:
  - cause the UWB communication unit in to carry out second UWB communication with the external communication device using the plurality of antennas; and
  - select a different antenna of the plurality of antennas for subsequent UWB communication based on second channel responses determined from the plurality of antennas.

16. The non-transitory computer-readable medium of claim 15, wherein the output of the inertial sensor is indicative of a movement of the communication device and/or an orientation of the communication device relative to the external communication device.

17. The non-transitory computer-readable medium of claim 15, further storing machine instructions to cause the antenna selection unit to select the specific antenna based on an analysis of a channel impulse response (CIR) resulting from the UWB communication.

\* \* \* \* \*